United States Patent
Saliba et al.

(10) Patent No.: US 6,768,608 B2
(45) Date of Patent: Jul. 27, 2004

(54) MULTI-CHANNEL MAGNETIC TAPE SYSTEM HAVING OPTICAL TRACKING SERVO

(75) Inventors: George A. Saliba, Northboro, MA (US); Satya A. Mallick, Milford, MA (US); Chan Kim, Holliston, MA (US); Carol Turgeon, Franklin, MA (US); Leo Cappabianca, Worcester, MA (US); Lewis Cronis, Mendon, MA (US)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 10/153,767

(22) Filed: May 22, 2002

(65) Prior Publication Data

US 2002/0141103 A1 Oct. 3, 2002

Related U.S. Application Data

(63) Continuation of application No. 09/046,723, filed on Mar. 24, 1998.

(51) Int. Cl.⁷ .............................................. G11B 5/596
(52) U.S. Cl. ................................................... 360/77.03
(58) Field of Search ...................... 360/75, 74.6, 77.03, 360/78.11, 77.12

(56) References Cited

U.S. PATENT DOCUMENTS

| | | |
|---|---|---|
| 2,923,781 A | 2/1960 | Gordon et al. |
| 3,404,392 A | 10/1968 | Sordello |
| 3,426,337 A | 2/1969 | Black et al. |
| 3,426,377 A | 2/1969 | Black et al. |
| 3,637,991 A | 1/1972 | Yanagawa |
| 3,662,120 A | 5/1972 | Hess |
| 3,768,752 A | 10/1973 | Bettini et al. |
| 3,790,755 A | 2/1974 | Silverman |
| 3,838,291 A | 9/1974 | Marion et al. |
| 3,914,793 A | 10/1975 | Burnham |
| 3,916,039 A | 10/1975 | Akashi et al. |
| 3,980,480 A | 9/1976 | Laridon et al. |
| 4,008,085 A | 2/1977 | Lemahieu et al. |
| 4,123,788 A | 10/1978 | Kruger |
| 4,176,381 A | 11/1979 | de Niet et al. |
| 4,275,425 A | 6/1981 | Watanabe et al. |
| 4,313,143 A | 1/1982 | Zarr |
| 4,315,283 A | 2/1982 | Kinjo et al. |
| 4,340,305 A | 7/1982 | Smith et al. |

(List continued on next page.)

FOREIGN PATENT DOCUMENTS

| | | |
|---|---|---|
| CH | 586 944 | 4/1977 |
| DE | 24 06 292 | 8/1975 |
| DE | 2406292 | 8/1975 |
| DE | 26 16 362 | 11/1977 |
| DE | 32 01 935 | 8/1983 |
| DE | 34 17 426 | 11/1985 |
| DE | 41 42 052 | 7/1992 |
| EP | 0 069 548 | 1/1983 |
| EP | 0 083 753 | 7/1983 |
| EP | 0 097 774 | 1/1984 |
| EP | 0 108 258 | 5/1984 |

(List continued on next page.)

Primary Examiner—David Hudspeth
Assistant Examiner—K. Wong

(57) ABSTRACT

A magnetic storage medium formed on a front major surface of a tape substrate defines a multiplicity of longitudinal data recording and playback tracks, each track having a nominal lateral location relative to the other tracks: and a predetermined optically manifested track servo pattern defined on the back major surface of the tape for indicating lateral displacement of the tape from a nominal lateral location of the track during tape movement across a read/write head. A magnetic tape recording and playback system employing the magnetic storage medium is also disclosed.

25 Claims, 9 Drawing Sheets

U.S. PATENT DOCUMENTS

| | | | |
|---|---|---|---|
| 4,371,904 A | | 2/1983 | Brooke |
| 4,380,032 A | | 4/1983 | Pfost |
| 4,392,163 A | * | 7/1983 | Rijckaert et al. ............. 360/76 |
| 4,424,111 A | | 1/1984 | Moeller et al. |
| 4,558,383 A | | 12/1985 | Johnson |
| 4,570,191 A | | 2/1986 | Di Stefano et al. |
| 4,578,311 A | | 3/1986 | Ishikuro et al. |
| 4,626,469 A | | 12/1986 | Yamaguchi et al. |
| 4,633,451 A | | 12/1986 | Ahn et al. |
| 4,677,505 A | * | 6/1987 | Nukada et al. .......... 360/77.12 |
| 4,679,104 A | | 7/1987 | Dahlerud |
| 4,737,877 A | | 4/1988 | Krongelb et al. |
| 4,746,542 A | | 5/1988 | Chino et al. |
| 4,750,067 A | | 6/1988 | Gerfast |
| 4,802,030 A | | 1/1989 | Henry et al. |
| 4,816,939 A | | 3/1989 | Ford et al. |
| 4,816,941 A | | 3/1989 | Edel et al. |
| 4,843,494 A | | 6/1989 | Cronin et al. |
| 4,848,698 A | | 7/1989 | Newell et al. |
| 4,868,046 A | | 9/1989 | Moriizumi et al. |
| 4,876,886 A | | 10/1989 | Bible et al. |
| 4,884,260 A | | 11/1989 | Bouldin et al. |
| 4,935,835 A | | 6/1990 | Godwin et al. |
| 4,937,810 A | | 6/1990 | Drexler et al. |
| 4,958,245 A | | 9/1990 | Roth et al. |
| 4,961,123 A | | 10/1990 | Williams et al. |
| 4,969,058 A | | 11/1990 | Williams et al. |
| 4,983,496 A | | 1/1991 | Newell et al. |
| 4,996,677 A | * | 2/1991 | Naito et al. .................... 369/14 |
| 5,008,765 A | | 4/1991 | Youngquist |
| 5,016,240 A | | 5/1991 | Strandjord et al. |
| 5,038,030 A | | 8/1991 | Hayashi et al. |
| 5,050,017 A | | 9/1991 | Carr et al. |
| 5,065,387 A | | 11/1991 | Roth et al. |
| 5,067,039 A | | 11/1991 | Godwin et al. |
| 5,105,322 A | | 4/1992 | Steltzer |
| 5,120,927 A | | 6/1992 | Williams et al. |
| 5,120,976 A | * | 6/1992 | Clayton et al. ........ 250/559.07 |
| 5,121,371 A | | 6/1992 | Farnsworth et al. |
| 5,163,032 A | | 11/1992 | Van Nieuwland et al. |
| 5,196,297 A | | 3/1993 | Dombrowski et al. |
| 5,196,969 A | | 3/1993 | Iwamatsu et al. |
| 5,210,672 A | | 5/1993 | Ivers et al. |
| 5,229,620 A | | 7/1993 | Pahr |
| 5,262,908 A | | 11/1993 | Iwamatsu et al. |
| 5,279,775 A | | 1/1994 | Thomas et al. |
| 5,280,402 A | | 1/1994 | Anderson et al. |
| 5,283,773 A | | 2/1994 | Thomas et al. |
| 5,311,378 A | | 5/1994 | Williams et al. |
| 5,319,507 A | | 6/1994 | Umebayashi et al. |
| 5,322,987 A | | 6/1994 | Thomas et al. |
| 5,333,091 A | | 7/1994 | Iggulden et al. |
| 5,349,484 A | | 9/1994 | Koehler |
| 5,363,255 A | | 11/1994 | Ivers et al. |
| 5,369,631 A | | 11/1994 | Hwang |
| 5,371,636 A | | 12/1994 | Nayak et al. |
| 5,379,283 A | | 1/1995 | Miyajima |
| 5,379,710 A | | 1/1995 | Schwarz |
| 5,392,173 A | * | 2/1995 | Kinoshita et al. ............. 360/75 |
| 5,414,578 A | | 5/1995 | Lian et al. |
| 5,414,585 A | | 5/1995 | Saliba |
| 5,432,652 A | | 7/1995 | Comeaux et al. |
| 5,448,430 A | | 9/1995 | Bailey et al. |
| 5,450,257 A | | 9/1995 | Tran et al. |
| 5,452,152 A | | 9/1995 | Rudi |
| 5,452,153 A | * | 9/1995 | Baheri et al. ............. 360/78.05 |
| 5,457,586 A | | 10/1995 | Solhjell |
| 5,462,823 A | | 10/1995 | Evans et al. |
| 5,475,670 A | | 12/1995 | Hamada et al. |
| 5,510,140 A | | 4/1996 | Kurose et al. |
| 5,515,212 A | | 5/1996 | Chiao et al. |
| 5,518,804 A | | 5/1996 | Mizuno et al. |
| 5,523,904 A | | 6/1996 | Saliba |
| 5,532,042 A | | 7/1996 | Kawarai et al. |
| 5,535,069 A | | 7/1996 | Chiao et al. |
| 5,563,868 A | | 10/1996 | Farnsworth et al. |
| 5,566,033 A | | 10/1996 | Frame et al. |
| 5,589,247 A | | 12/1996 | Wallack et al. |
| 5,615,205 A | | 3/1997 | Belser |
| 5,661,616 A | | 8/1997 | Tran et al. |
| 5,661,823 A | | 8/1997 | Yamaguchi et al. |
| 5,674,583 A | | 10/1997 | Nakayama et al. |
| 5,675,448 A | | 10/1997 | Molstad et al. |
| 5,677,806 A | | 10/1997 | Eckberg et al. |
| 5,680,278 A | | 10/1997 | Sawtelle, Jr. |
| 5,689,384 A | | 11/1997 | Albrecht et al. |
| 5,705,268 A | | 1/1998 | Ishikawa et al. |
| 5,718,964 A | | 2/1998 | Naoe et al. |
| 5,726,834 A | | 3/1998 | Eckberg et al. |
| 5,729,519 A | | 3/1998 | Nakanishi et al. |
| 5,877,910 A | | 3/1999 | Williams et al. |
| 5,993,948 A | | 11/1999 | Yamazaki et al. |
| 6,033,752 A | | 3/2000 | Suzuki et al. |
| 6,063,489 A | | 5/2000 | Kobayashi et al. |
| 6,084,740 A | | 7/2000 | Leonhardt et al. |
| 6,103,365 A | | 8/2000 | Ishii et al. |
| 6,108,159 A | | 8/2000 | Nute et al. |
| 6,236,529 B1 | | 5/2001 | Leonhardt et al. |
| 6,246,535 B1 | | 6/2001 | Saliba et al. |
| 6,275,349 B1 | * | 8/2001 | Smith ...................... 360/77.03 |
| 6,319,595 B1 | | 11/2001 | Katashima et al. |
| 6,480,351 B2 | | 11/2002 | Leonhardt et al. |
| 6,549,363 B2 | | 4/2003 | Leonhardt et al. |

FOREIGN PATENT DOCUMENTS

| | | |
|---|---|---|
| EP | 0 119 568 | 9/1984 |
| EP | 0 130 495 | 1/1985 |
| EP | 0 155 000 | 9/1985 |
| EP | 0 166 199 | 1/1986 |
| EP | 0 177 737 | 4/1986 |
| EP | 0 180 258 | 5/1986 |
| EP | 0 189 948 | 8/1986 |
| EP | 0 244 005 | 11/1987 |
| EP | 0 257 713 | 3/1988 |
| EP | 0 311 485 | 4/1989 |
| EP | 0 311 859 | 4/1989 |
| EP | 0 336 419 | 10/1989 |
| EP | 0 344 759 | 12/1989 |
| EP | 0 347 074 | 12/1989 |
| EP | 0 351 837 | 1/1990 |
| EP | 0 353 007 | 1/1990 |
| EP | 0 368 268 | 5/1990 |
| EP | 0 368 269 | 5/1990 |
| EP | 0 390 555 | 10/1990 |
| EP | 0 423 662 | 4/1991 |
| EP | 0 434 230 | 6/1991 |
| EP | 0 443 810 | 8/1991 |
| EP | 0 535 112 | 12/1991 |
| EP | 0 484 774 | 5/1992 |
| EP | 0 484 775 | 5/1992 |
| EP | 0 484 779 | 5/1992 |
| EP | 0 484 780 | 5/1992 |
| EP | 0 496 461 | 7/1992 |
| EP | 0 549 845 | 7/1993 |
| EP | 0 549 854 | 7/1993 |
| EP | 0 555 511 | 8/1993 |
| EP | 0 564 187 | 10/1993 |
| EP | 0 645 043 | 12/1993 |
| EP | 0 645 044 | 12/1993 |
| EP | 0 655 960 | 12/1993 |
| EP | 0 598 503 | 5/1994 |

| | | |
|---|---|---|
| EP | 0 606 710 | 7/1994 |
| EP | 0 684 597 | 11/1995 |
| FR | 2 315 142 | 1/1975 |
| FR | 2315142 | 1/1975 |
| GB | 2 008 290 | 5/1979 |
| GB | 1 595 136 | 8/1981 |
| GB | 2 121 227 | 12/1983 |
| GB | 2335785 | 9/1999 |
| JP | 56-111169 | 9/1981 |
| JP | 57-050346 | 3/1982 |
| JP | 57-120230 | 7/1982 |
| JP | 57-120255 | 7/1982 |
| JP | 61-142530 | 6/1986 |
| JP | 61-293372 | 12/1986 |
| JP | 62-192025 | 8/1987 |
| JP | 63-148416 | 6/1988 |
| JP | 63-251924 | 10/1988 |
| JP | 64-070916 | 3/1989 |
| JP | 3-141087 | 6/1991 |
| JP | 3-201215 | 9/1991 |
| JP | 3-219432 | 9/1991 |
| JP | 3-242816 | 10/1991 |
| JP | 4-038632 | 2/1992 |
| JP | 4-059399 | 2/1992 |
| JP | 4-252417 | 9/1992 |
| JP | 4-305844 | 10/1992 |
| JP | 5-073883 | 3/1993 |
| JP | 6-020414 | 1/1994 |
| JP | 6-139549 | 5/1994 |
| JP | 6-243619 | 9/1994 |
| JP | 6-259736 | 9/1994 |
| JP | 7-029136 | 1/1995 |
| JP | 7-057412 | 3/1995 |
| JP | 7-065434 | 3/1995 |
| JP | 7-220255 | 8/1995 |
| JP | 7-082626 | 9/1995 |
| JP | 8-174669 | 7/1996 |
| JP | 9-007131 | 1/1997 |
| JP | 9-033773 | 2/1997 |
| JP | 9-035246 | 2/1997 |
| JP | 9-288813 | 9/1997 |
| JP | 9-293230 | 9/1997 |
| JP | 9-265626 | 10/1997 |
| JP | 9-289973 | 11/1997 |
| JP | 9-297914 | 11/1997 |
| JP | 9-320197 | 12/1997 |
| KR | 9406847 | 7/1994 |
| SU | 1137513 | 1/1985 |
| WO | WO 83/01858 | 5/1983 |
| WO | WO 85/02933 | 7/1985 |
| WO | WO 85/03376 | 8/1985 |
| WO | WO 88/02168 | 3/1988 |
| WO | WO 94/12975 | 6/1994 |

* cited by examiner

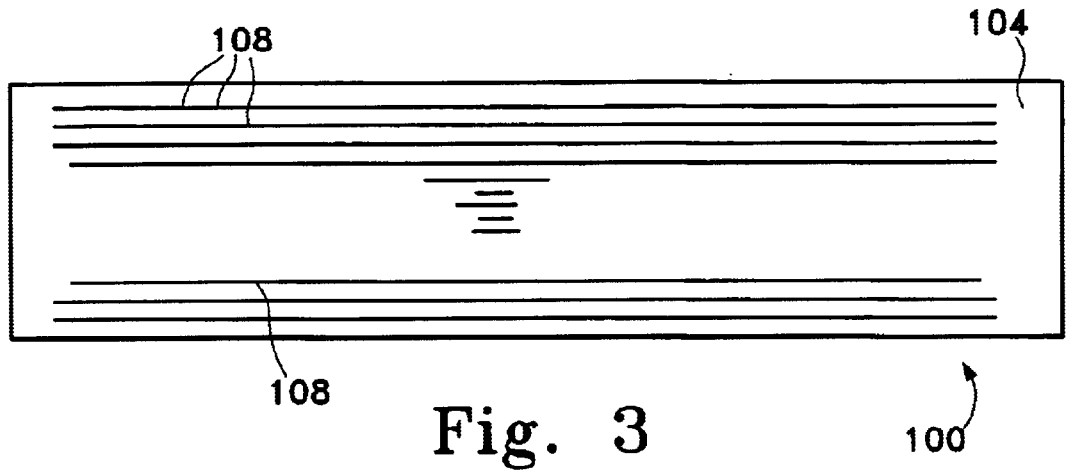
Fig. 3
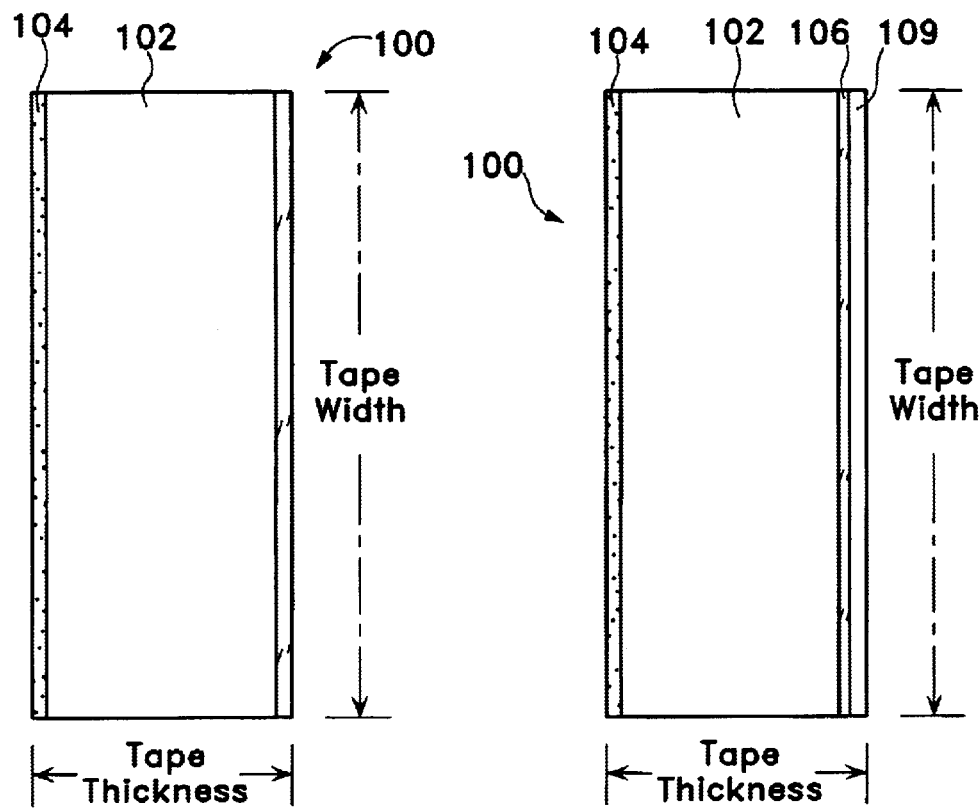
Fig. 4
(PRIOR ART)
Fig. 4A

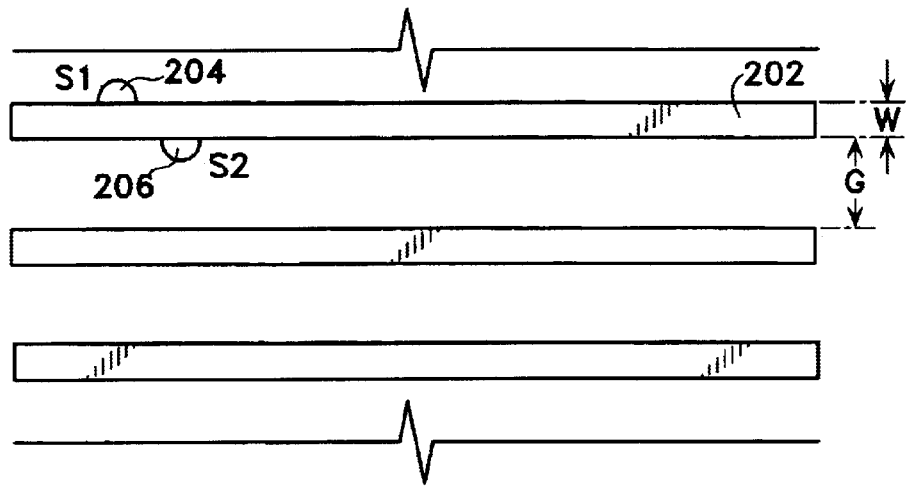
Fig. 6
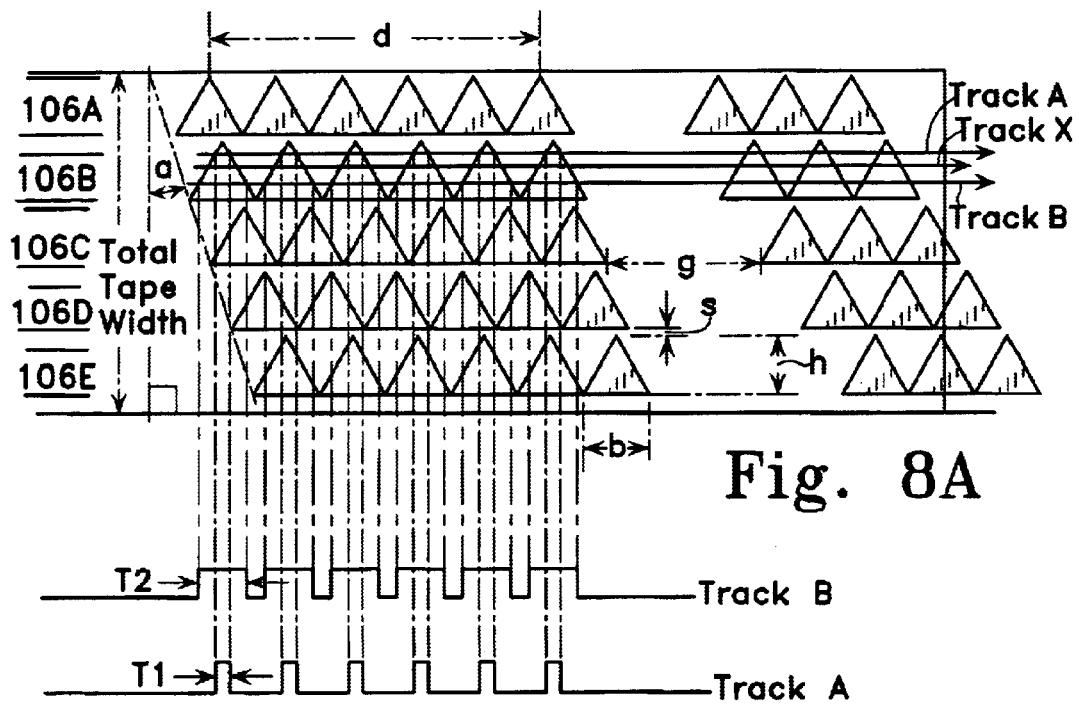
Fig. 8A
Fig. 8B

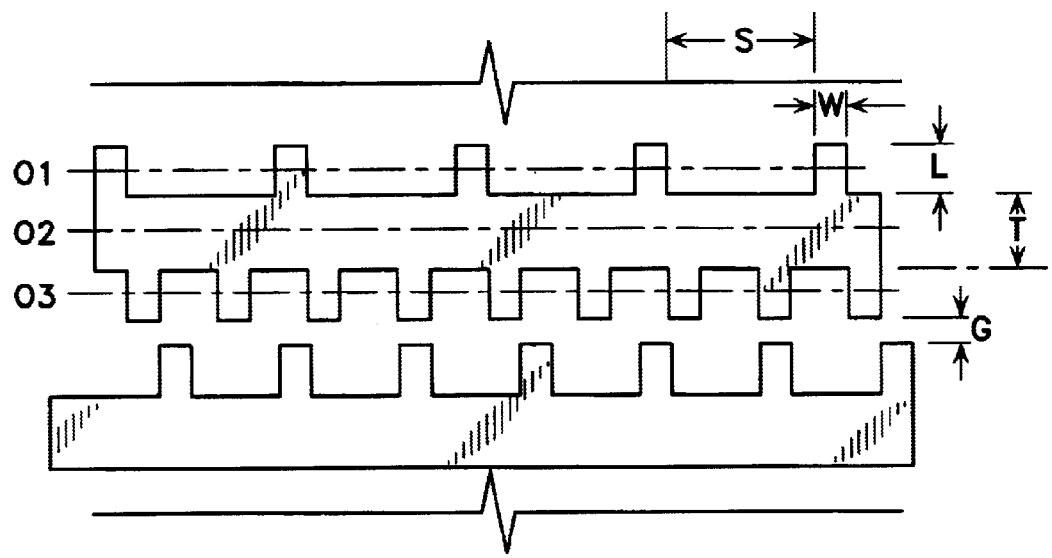
Fig. 10A
Fig. 10B
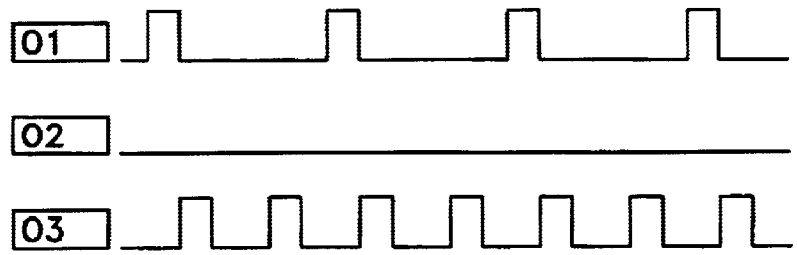
Output of detection circuit

MULTI-CHANNEL MAGNETIC TAPE SYSTEM HAVING OPTICAL TRACKING SERVO

REFERENCE TO RELATED APPLICATION

This application is a continuation of U.S. application Ser. No. 09/046,723, filed Mar. 24, 1998. This application is related to commonly assigned U.S. patent application Ser. No. 09/046,873 (now abandoned), filed on Mar. 24, 1998, and entitled "Dual-Actuator Pivoting Lever Tape Head Positioner", George A. Saliba, Inventor (Quantum Docket No. Q98-1087-US1), the disclosure thereof being incorporated herein by reference.

FIELD OF THE INVENTION

The present invention relates to magnetic tape recording. More particularly, the present invention relates to a multi-channel magnetic tape recording system employing an optical tracking servo to sense and correct for lateral tape motion, and lateral track motion, as the tape is drawn longitudinally across a head transducer assembly.

BACKGROUND OF THE INVENTION

Digital tape recording remains a viable solution for storage of massive amounts of data. Conventionally, at least two approaches are employed for recording of digital information onto magnetic recording tape. One approach calls for moving the tape past a rotating head structure which records and plays back user information from discontinuous transverse tracks. Interactive servo systems are employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is being required of all commercially viable mass storage devices and media. In the case of linear tape recording a popular trend is toward multi-head, multi-channel fixed head structures with narrowed recording gaps and track widths so that many linear tracks may be achieved on a tape medium of predetermined width, such as one-half inch width tape. Tape substrates are also being made thinner, with increased tape lengths being made possible in small diameter reel packages.

Because of a relatively high linear tape velocity, and because tape substrates continue to be made thinner and thinner, guiding tape past a tape head structure along an accurate invariant linear path has proven to be highly problematical. One error phenomena is known as "lateral tape motion" or "LTM". LTM is a major source of tracking errors in linear tape recording. One approach to minimizing LTM tracking errors is to provide a multi-roller tape guide structure, such as the type described in commonly assigned U.S. Pat. No. 5,414,585 entitled: "Rotating Tape Edge Guide", the disclosure thereof being incorporated herein by reference. While this approach has provided a viable "open loop" solution to LTM, with the advent of new head technologies, such as magneto-resistive read heads, and new higher coercivity recording media, track widths may be very small, and many additional tracks may be defined on the tape. Unfortunately, a limiting factor is LTM, and at some track width dimension and track density, it is not possible to follow the tape accurately enough to provide reliable performance.

One solution to correction for LTM has been to record or pre-record magnetic servo tracks (i.e. "servowrite") onto the tape before it reaches the user. These tapes are known in the art as "preformatted" tapes, and the step of recording accurate servo tracks onto the tape is both time consuming and expensive. Examples of tape systems employing preformatted tapes are given by U.S. Pat. No. 5,432,652 entitled: "Servo and Data Format for Magnetic Tape Having Plural Spaced-Apart Servo Areas Interleaved with Data Track Areas Having Serpentine Track Scanning Using Any One of a Plurality of Number of Concurrently Accessed Tracks." Another example is provided by U.S. Pat. No. 5,675,448 entitled: "Track Pitch Error Compensation System for Data Cartridge Tape Drives".

Once the decision has been made to provide separate magnetic servo tracks or to embed servo information within the magnetic user data tracks recorded onto the tape, a suitable coarse position/fine position actuator mechanism must be added to the tape drive. One example of a stepper motor/voice coil actuator is provided by U.S. Pat. No. 5,280,402 entitled: "Combined Stepper Motor and Voice Coil Head Positioning Apparatus".

Optical servo tracks have been provided within floppy disks. One example of a floppy disk and compatible drive is given in U.S. Pat. No. 5,065,387 entitled: "Method and Apparatus for Generating Tracking Error Signals by Means of an Optical Servo System", the disclosure thereof being incorporated herein by reference.

While these prior methods and approaches have worked within their intended applications and uses, improvements and simplifications in the medium and drive apparatus have been lacking. Accordingly, a hitherto unsolved need has remained for a multi-track, multi-channel digital streaming tape system which overcomes limitations and drawbacks of the known prior approaches.

SUMMARY OF THE INVENTION WITH OBJECTS

A general object of the present invention is to provide a tape recording system and recording tape with an optical servo pattern to enable correction of LTM in a manner overcoming limitations and drawbacks of the prior art.

In accordance with one aspect of the present invention a linear magnetic tape medium has a first surface accessible by a laterally positionable, multi-head magnetic read/write transducer assembly, and a second surface accessible by an optical servo transducer assembly physically coupled to the magnetic read/write transducer assembly. A multiplicity of linear data tracks are defined on the first surface. Each linear track provides storage of magnetic data patterns written by a head of said magnetic read/write transducer positioned and maintained thereat by a lateral head positioner. A multiplicity of linearly extending servo features are formed on the second surface and are read by the optical servo transducer which generates a servo feedback signal to aid track following in the presence of lateral tape motion by the magnetic read/write transducer as the tape medium is drawn linearly there across.

These and other objects, aspects, advantages and features of the invention will be more fully understood and appreciated upon considering the following detailed description of a preferred embodiment presented in conjunction with the accompanying drawings.

BRIEF DESCRIPTION OF THE DRAWINGS

In the Drawings:

FIG. 3 is a diagrammatic view in elevation of a first major surface of a recording tape incorporating principles of the present invention and showing a multiplicity of linear recording tracks.

FIG. 4 is a diagrammatic view in side elevation and cross-section of a conventional magnetic recording tape, and FIG. 4a is a diagrammatic view in side elevation and cross section of the new FIG. 3 recording tape, showing a first major surface providing a magnetic recording medium along with a second major surface providing an optical servo pattern in accordance with principles of the present invention.

FIG. 6 is a diagrammatic view in elevation of one optical servo pattern formed on the second major surface of the FIG. 4a recording tape as a series of linear optical reflective servo tracks.

FIG. 8A is a diagrammatic view in elevation of an alternative optical servo pattern formed on the second major surface of the FIG. 4a recording tape.

FIG. 8B is a graph of electrical servo signals generated by an optical servo head of the FIG. 1 assembly during sensing of one of the linear servo patterns shown in FIG. 8A.

FIG. 10A is a diagrammatic view in elevation of another optical servo pattern formed on the second major surface of the FIG. 4a recording tape.

FIG. 10B is a graph of electrical servo signals generated by an optical servo head of the FIG. 1 assembly during sensing of the FIG. 10A pattern over a linear track during tape operations.

DETAILED DESCRIPTION OF A PREFERRED EMBODIMENT

Figure 1:
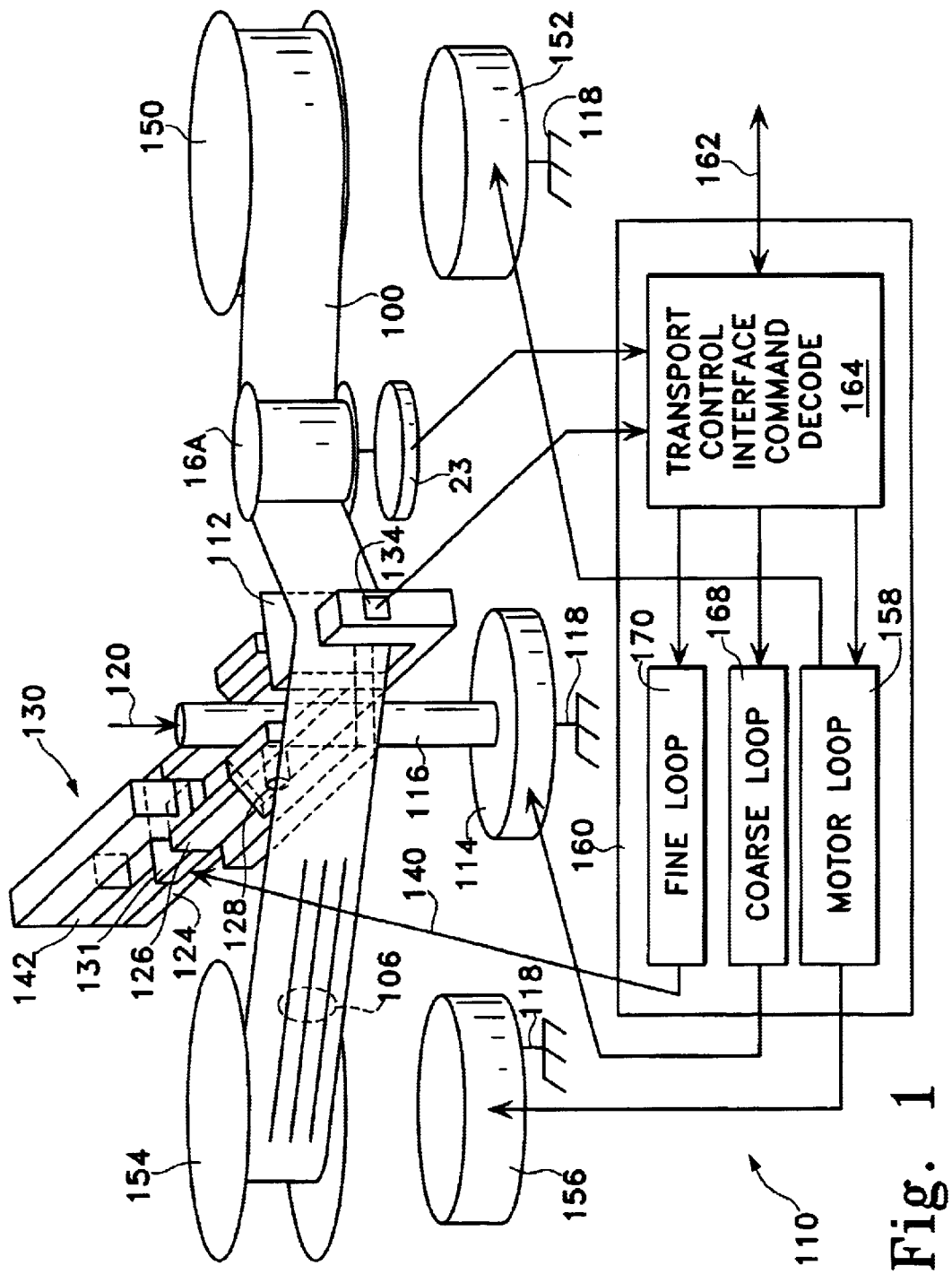
FIG. 1 is an isometric, highly diagrammatic, structural and electrical block view of a multi-channel magnetic tape recording system employing an optical tracking servo to sense and correct for lateral tape motion in accordance with principles of the present invention.

Referring initially to FIG. 1, a magnetic recording tape 100 is shown being drawn through a tape drive mechanism 110 from a supply reel to a take-up reel (not shown) along a nominal linear tape path indicated by arrow TP. The tape 100 is moved at a considerable linear relative velocity, such as 150 inches per second. Because of this high relative velocity and contact between the tape 100 and mechanical tape guide and head elements of the tape drive 110, the linear movement of the tape 100 along the nominal tape path TP results in certain undesirable additional tape movements, a principal one of which being lateral tape motion ("LTM") or motion transverse to the nominal tape path as indicated by arrow LTM.

Figure 5:
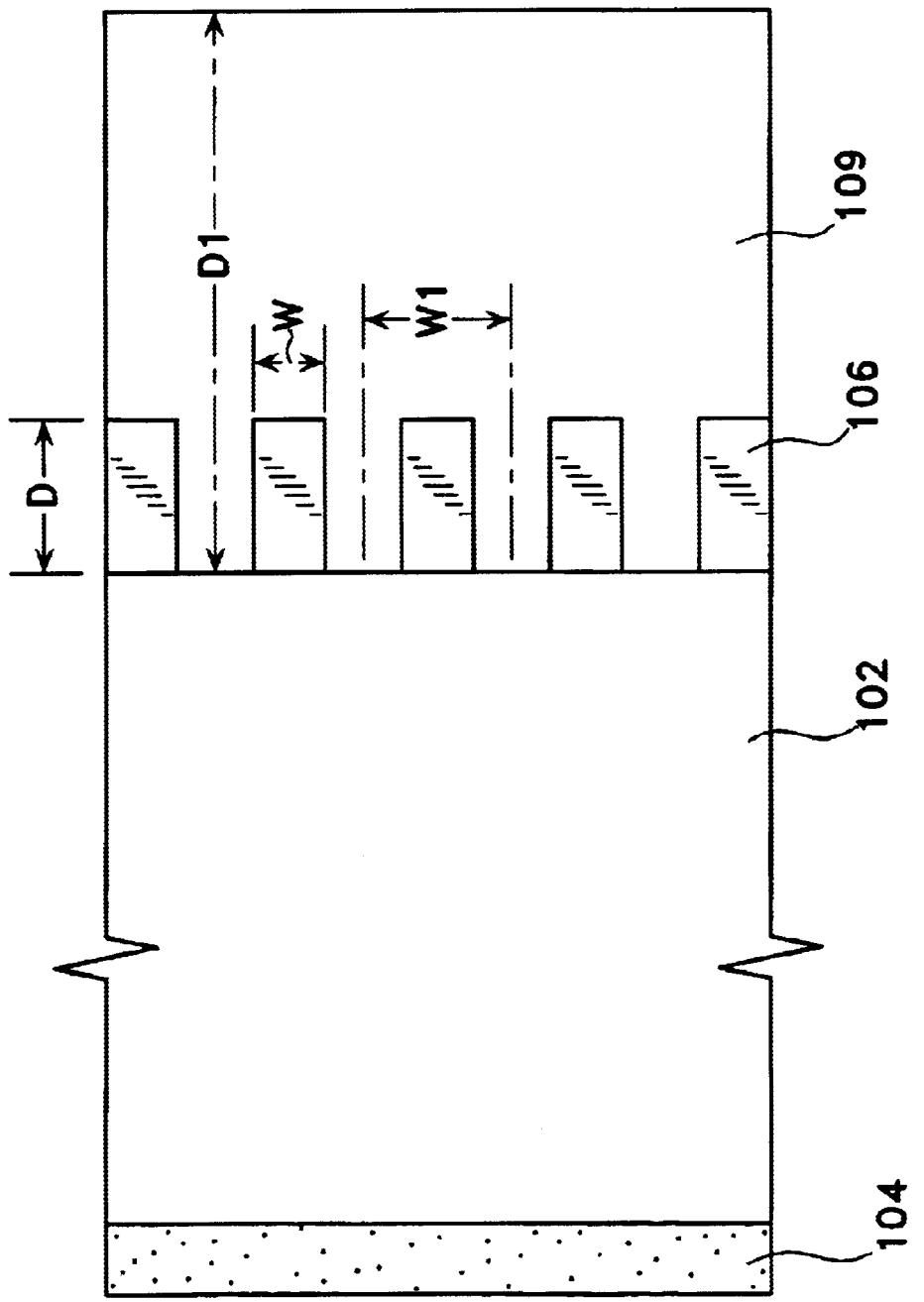
FIG. 5 is an enlarged diagrammatic front view of the FIG. 4a recording tape showing progressive removal of various layers thereof.

As discussed above, although mechanical steps are known to reduce LTM, at certain high linear track densities and narrow track widths it is not practical to rely entirely upon open loop tape mechanisms. Accordingly, the magnetic recording tape 100 includes, in addition to a plastic substrate (base film) 102 and a magnetic storage layer 104 coated onto a first major surface (FIG. 4), an optical servo pattern 106 formed so as to be viewed at a reverse major surface of the tape (FIG. 4a). In accordance with an aspect of the present invention, the optical servo pattern 106 is applied during tape manufacturing, as by printing or embossing. A thin transparent protective layer 109 is formed over the optical servo pattern 106 as shown in FIG. 4a and FIG. 5, for example.

Figure 2:
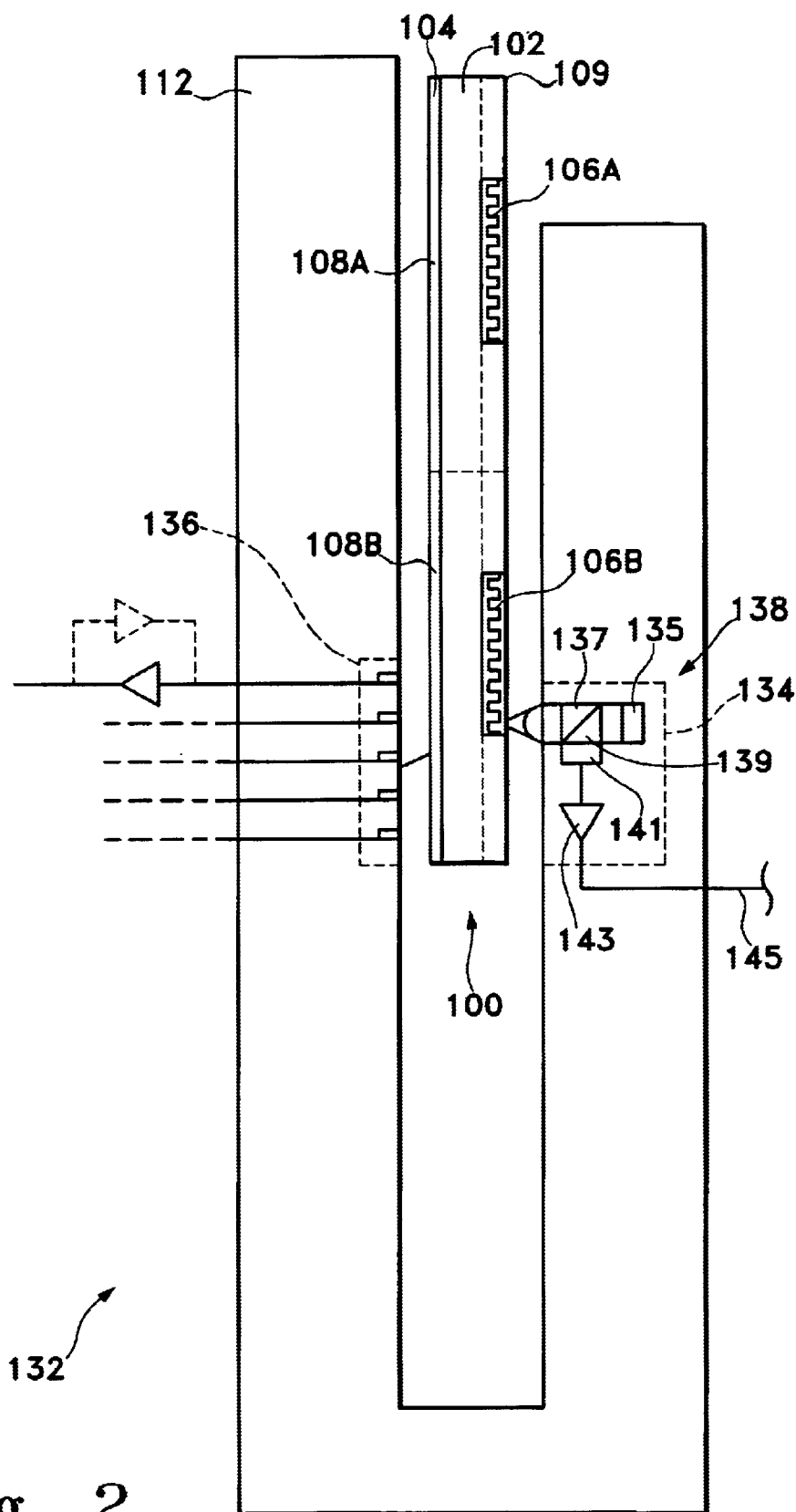
FIG. 2 is a highly diagrammatic enlarged view in elevation and cross-section of a magnetic/optical head assembly used by the FIG. 1 tape recording system.

The tape 100 provides for multiple linear magnetic data storage tracks 108 defined in the magnetic storage layer 104 (FIG. 3). Accordingly, the tape drive mechanism 110 includes a multi-channel magnetic head structure 112 having multiple read and write head elements aligned to read some, but not all of the magnetic data storage tracks 108. The write elements are preferably realized as thin film magnetic write structures, and the read elements may be thin film or magneto-resistive read elements. In FIG. 2, a head array comprising e.g. five magneto-resistive read transducers is depicted within the head structure 112. While five heads are shown, in practice ten or twelve heads are presently preferred for both writing and reading within the head structure 112. With the particular arrangement of heads shown in FIG. 2, the effective recording area of the tape 100 is divided into multiple zones or bands of parallel magnetic recording tracks 108, there being two zones 108A, and 108B shown in FIG. 2. This arrangement therefore requires a head positioner mechanism which coarsely positions the head structure 112 and head array 136 within a particular zone, e.g. zone 108B shown in FIG. 2, and at nominal track set positions within each zone. Moreover, in order to follow LTM, the head positioner mechanism must provide for very rapid head position corrections tracking the LTM offsets. Generally, this requirement is satisfied by providing a head positioner mechanism which is corrected by an optical servo pattern 106 and by an optical servo feedback control 138. In the example presented by FIG. 2 this requirement is satisfied by providing e.g. two bands of optical servo patterns 106A and 106B.

The tape drive mechanism 110 shown in FIG. 1 includes a lateral coarse head positioner, including e.g. an incremental step motor 114 and lead screw 116.

The motor 114 is attached to a base 118, while the lead screw 116 may be rotationally mounted to the base 118 between the step motor 114 and a journal 120. As the step motor 114 rotates the lead screw, a lead screw follower block 122 follows the lead screw over a limited range of bi-directional lateral displacement dependent upon rotational direction of lead screw 116.

A head mounting platform or structure 124 supports a head mounting beam structure or assembly 126. The head mounting beam 126 includes a pivot or fulcrum 128 which enables the beam 126 to pivot about the platform 124 over a very limited range of rotational displacement in a lateral or transverse direction relative to a main longitudinal axis (direction of travel) of tape 100. A limited displacement force is provided by a voice coil motor 130 extending on one side of the pivot 128, while a magnetic/optical tape head assembly 132 including the head structure 112 and head array 136 is provided on an opposite side of the pivot 128. The magnetic/optical tape head assembly 132 is generally U-shaped and includes on one inside wall the multi-channel magnetic transducer head array 112, and on an opposite inside wall an optical servo head 134. The coarse head positioner therefore positions the head assembly 132 at each zone, and at each track set within the particular zone. For each track set there is provided an optical servo tracking pattern, so that if the optical servo head follows the appropriate tracking pattern during linear tape movement, the magnetic head array 136 will follow the tracks 108 of the particular track set.

A supply reel 150 supplies the tape 100 into the mechanism 110. The reel 150 is preferably a part of a single-reel tape cartridge which includes a suitable buckling mechanism. The cartridge and buckling mechanism are conventional and are not described further. The reel 150 is rotationally engaged by a supply reel drive motor 152. A take-up reel 154 within the transport 110 is controlled by a take-up reel drive motor 156. The motors 152 and 156 are controlled independently by a motors control servo loop 158 in order to provide an appropriate amount of tension on the tape 100 irrespective of the relative diameters of the tape spools formed on the reels 150 and 154 at any particular time. A tape guide roller 16A is shown coupled to a tape speed sensing device, such as tachometer 23. The tachometer 23 is used conventionally by the motors control loop 158 in controlling relative torque applied by each of the motors 150 and 152.

A transport electronics circuit 160 includes a data and command interface bus 162 enabling the transport 110 to be connected to a computing environment. An interface command decode and user data processing unit 164 provides conventional tape command decode and status functions, and user data compression and expansion functions as well as error correction processes. It also supervises the motors loop 158, a coarse head position control loop 168 and a fine head position control loop 170. The coarse head position control loop 168 is used to control the stepper motor 114 to position the head structure 112 at each nominal track set location. It should be understood that the transport 110 includes a plurality of parallel user data channels, such as 6–12 channels, and that each nominal coarse head position locates the head structure 112 at approximately each set of 6–12 tracks. The fine head position control loop 170 responds to instantaneous tape position information sensed by e.g. the optical pickup head 134 from one of the servo track patterns 106 which corresponds to the set or group of lineal tracks presently being followed. Any positional offset or position error sensed by the optical head 134 will result in a corrective driving current passing through a voice coil 131 of the voice coil motor 130. This current will apply a torque force to the pivoting dual beam structure 126, and the head structure 112 will be returned to correct alignment with the magnetic data record tape tracks being followed as the optical head 134 follows a particular servo track pattern 106.

The optical servo track patterns 106 may provide continuous or discrete position error signals. Each track may be encoded with a unique value or code which enables the optical head and main control module 164 to determine which nominal servo track 106 is being followed. Advantageously, the servo track patterns 106 may be formed as a part of the tape manufacturing process, with the result that there need be no separate magnetic servo track writing operation as part of tape manufacturing. Conventional laser inscribing, embossing or patterning techniques may be used in real time during tape manufacture to provide the tracks 106.

As shown in FIG. 2, the optical servo head 134 may conventionally include a laser light source 135, an optical path 137 including lenses and a beam splitter 139, and a photo detector array 141 and preamplifier 143, such that a light beam may be focused upon a particular one of the servo patterns 106 on the reverse major side of the tape and result in electronically discernible LTM position error signals at the preamplifier 143. A resultant electrical error signal on a path 145 is sent to the optical servo feedback fine loop control block 170 within the control electronics 160. The block 170 generates a bi-directional head position correction driving current and applies the driving current via a path 140 to the lateral voice coil 131 of voice coil motor 130 which results in a servo bias torque. The bias torque is applied through the support structure 124 and head mounting beam structure 126 to pivot the magnetic/optical head assembly 132 about the journal 128 and thereby follow the tape 100 despite the presence of LTM. Ideally, the fine position servo feedback control block 170 operates continuously in real time to apply head position correction currents to the lateral voice coil of voice coil motor 130. The fine position servo loop has a high bandwidth, and the beam assembly 126 including voice coil 131 and head structure 132 has a low mass, such that position corrections may be applied and effected very rapidly to minimize any tracking errors.

The voice coil motor 130 includes in addition to the voice coil 131 a fixed portion 142 carrying e.g. a suitably magnetized permanent magnet. The fixed portion 142 is mechanically attached to the lead screw follower platform 122 by a suitable support bar. The voice coil 131 receives a head position correction current over the path 140 from the fine position servo feedback control block 170 and creates a magnetic field which interacts dynamically with a magnetic field provided by the permanent magnet of the fixed portion 142, such that a fine position correction force is generated which incrementally pivots the rigid beam structure 126 laterally to correct for LTM. The voice coil actuator motor 130 may comprise a permanent magnet/coil combination, or it may comprise a piezoelectric effect motive device. The head mounting structure pivot 128 may be freely rotatable relative to the bar 124 with the head mounting structure 126 mechanically biased to a neutral position, the bias being overcome by rotational force applied by the lateral voice coil actuator 130. Alternatively, the pivot 128 may be fixed to the bar 124 which thereupon functions as a torsion bar enabling limited range lateral displacement of the head mounting structure 126 in response to the driving force applied by the voice coil motor 130.

The optical servo head may comprise a suitable arrangement of light source and photo detector array, together with suitable integrated on-board amplifiers. One example of a conventional optical head is described in U.S. Pat. No. 5,615,205 to Belser entitled: "Bi-Level Optical Media Having Embossed Header Format", the disclosure thereof being incorporated herein by reference. An alternative preferred optical head may be similar to one which is described in an article by Yoshikawa, Nakanishi, Itoh, Yamazaki, Komino and Musha entitled: "Laser-Detector-Hologram Unit for Thin Optical Pick-up Head of a CD Player", *IEEE Trans. on Components, Packaging & Mfg. Tech*. Part B, Vol. 18, No. 2, May 1995, pp. 245–249, the disclosure thereof being incorporated herein by reference.

Figure 7:
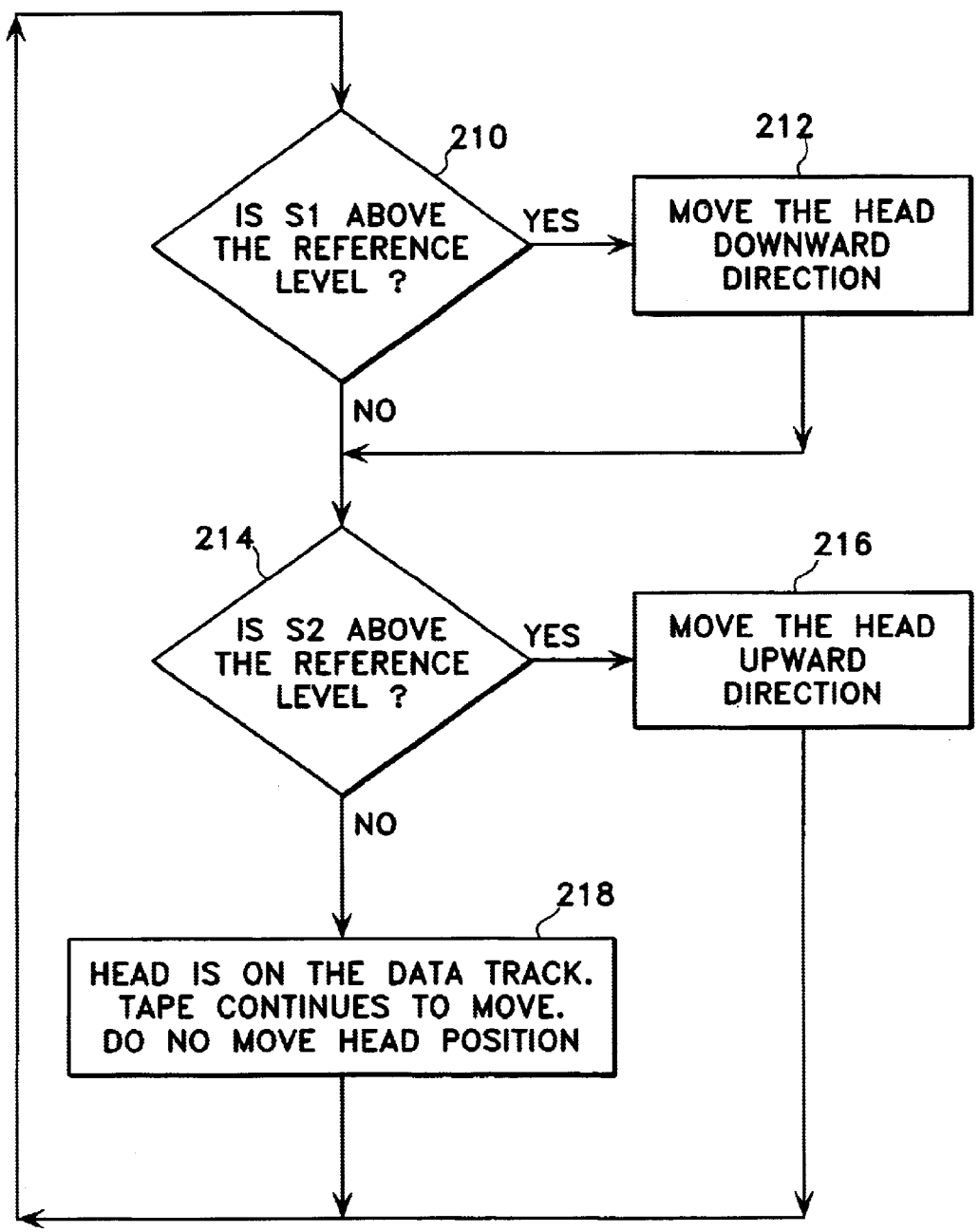
FIG. 7 is a flow diagram explaining operation of the optical tracking servo using the FIG. 6 servo pattern to enable the head to follow lateral tape motions during tape operations of the FIG. 1 system.

Turning now to FIG. 6, one preferred example of a servo pattern comprises a lineal reflective area 202. In this example two photo detectors 204 and 206 are aligned to follow opposite edges of the lineal reflective area 202. The photo detector 204 puts out an electrical signal S1, while the photo detector 206 puts out an electrical signal S2. FIG. 7 describes a control process which makes use of the FIG. 6 pattern in relation to a predetermined reference level. At a first step 210 the process determines whether the servo signal S1 is above the reference level. If so, a process step 212 causes the fine positioner to move the head structure 126 in a downward direction. If not, or following process step 212, a logical step 214 determines whether the servo signal S2 is above the reference level. If so, a process step 216 causes the head structure 126 to be moved in an upward direction, and a return is made to the initial step 210. If not, a process step 218 determines that the head structure 126 is properly aligned with the data track set, and a return is made to the initial process step 210. This process of FIG. 7, while simplified, continues in real time and includes appropriate damping so that the control loop remains stable.

Figure 9:
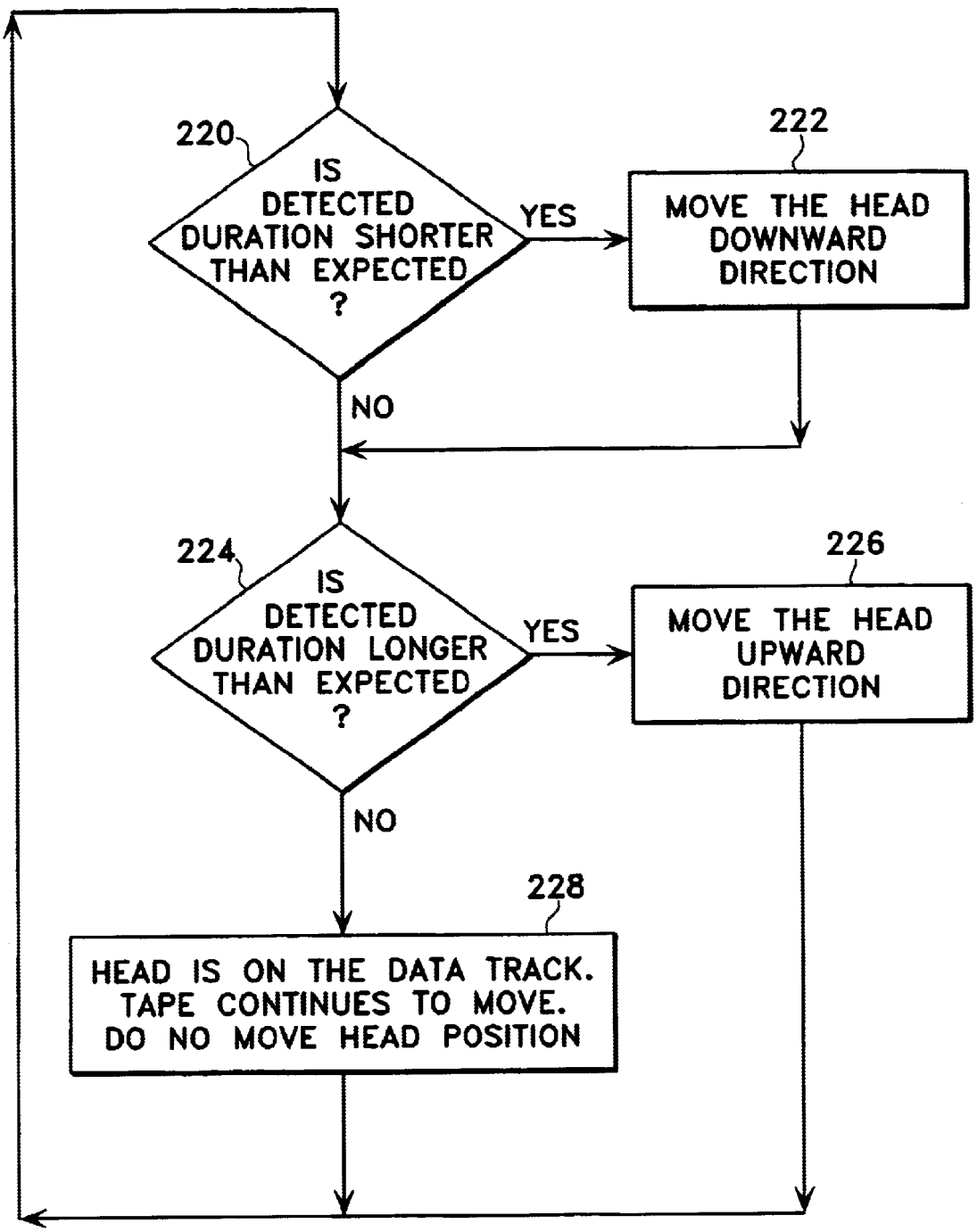
FIG. 9 is a flow diagram explaining operation of the optical tracking servo using the FIG. 8A servo pattern to enable the head to follow lateral tape motions during tape operations of the FIG. 1 system.

FIG. 8A illustrates another reflective servo pattern. In this example, there are e.g. five track set zones 106A, 106B, 106C, 106D and 106E. Each servo pattern, such as pattern for zone 106B, includes longitudinally arranged geometric reflective areas, such as equilateral triangle shapes which are equally spaced apart. As shown in FIG. 8B the interval of reflected light, in relation to the period of occurrence of the patterns, is used to determine lateral position of the tape and correct for LTM. For example, a track set A has a reflective interval T1 which is brief in relation to the period of the pattern, while a track set B has a reflective interval which is considerably longer and approaches the period of the pattern. FIG. 9 sets forth a control process which implements servo control of the head structure 126 with the FIG. 8A pattern. In the FIG. 9 process a logical step 220 determines whether the reflective pattern duration is shorter than expected for the nominal track set location. If so, a process step 222 causes the head structure 126 to be moved in e.g. a downward direction relative to the tape 100. If not, or following process step 222, a logical step 224 determines whether the reflective pattern duration is longer than expected for the particular track set location. If so, a process step 226 moves the head structure e.g. in an upward direction, and a return is made to the step 220. If not, a process step 228 determines that the head structure 126 is accurately following the nominal track set location, and a return is made to the step 220. Like the process of FIG. 7, the process of FIG. 9 operates continuously to provide closed loop fine positioning during linear movements of the tape 100 through the mechanism 110.

Figure 11:
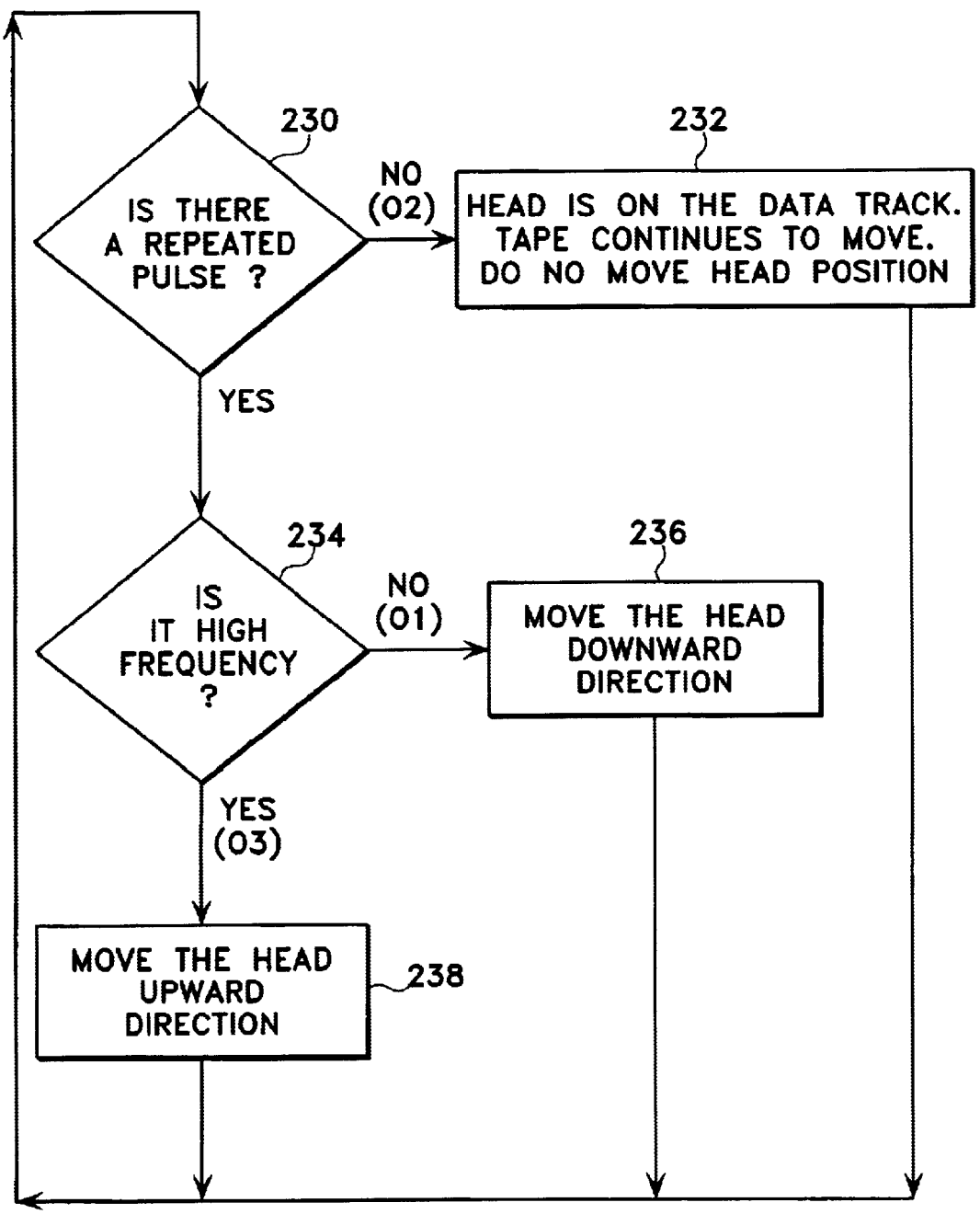
FIG. 11 is a flow diagram explaining operation of the optical tracking servo using the FIG. 10A servo pattern to enable the head to follow lateral tape motions during tape operations of the FIG. 1 system.

FIG. 10A illustrates yet another reflective servo pattern for each track set location. In this particular pattern a continuous linear reflective area has two periodic lateral reflective patterns along opposite major edges. As shown in FIG. 10B, one periodic pattern O1 provides a relatively low frequency electrical servo signal, which the other periodic pattern O3 provides a relatively high frequency electrical servo signal. A continuous on track pattern O2 has no periodic component. FIG. 11 sets forth a control process which makes use of the FIG. 10A pattern. A first logical step 230 determines if a repeated pulse is present in the servo signal. If not, a process step 232 determines that the head structure 126 is properly following the nominal track set and a return is made to the step 230. If so, a logical step 234 determines if e.g. a high frequency pattern is present. If not, a process step 236 impliedly determines that the low frequency pattern is present and moves the head structure 126 e.g. in a downward direction and thereupon returns to the initial step 230. If so, a process step 238 moves the head structure 126 in an upward direction and then returns to the initial process step 230.

The optical servo pattern can also make use of the diffractive property of light energy, creating a reflective pattern with overlapped reflective orders. If diffraction is used, pattern constraints will be selected to be compatible with the resultant diffraction, reflection patterns.

While the method and apparatus of the present invention have been summarized and explained by illustrative embodiments and applications in magnetic tape recording, it will be readily apparent to those skilled in the art that many widely varying embodiments and applications are within the teaching and scope of the present invention and that the examples presented herein are by way of illustration only and should not be construed as limiting the scope of this invention, which is more particularly set forth in the following claims.

What is claimed is:

1. A head assembly, comprising:
   a magnetic head; and
   an optical servo head configured so that, as the magnetic head moves, the optical servo head moves, the optical servo head being physically coupled directly to the magnetic head in a configuration that permits transport of magnetic tape therebetween.

2. The head assembly of claim 1, wherein, as the magnetic head moves in a first direction, the optical servo head moves in the first direction.

3. The head assembly of claim 1, wherein, as the magnetic head moves a first distance, the optical servo head moves the first distance.

4. The head assembly of claim 1, wherein the magnetic head and the optical servo head form a unitary component.

5. The head assembly of claim 1, wherein the magnetic head faces the servo head.

6. The head assembly of claim 1, wherein the head assembly is configured so that, as a tape passes through the head assembly, one side of the tape faces the magnetic head and an opposite side of the tape faces the optical servo head.

7. A head assembly, comprising:
   a magnetic transducer assembly; and
   an optical servo transducer assembly configured so that, as the magnetic transducer assembly moves, the optical servo transducer assembly moves, the optical servo transducer being physically coupled directly to the magnetic transducer assembly in a configuration that permits transport of magnetic tape therebetween.

8. The head assembly of claim 7, wherein the magnetic transducer assembly comprises at least one magnetic head.

9. The head assembly of claim 8, wherein the at least one magnetic head comprises a plurality of magnetic read and write elements.

10. The head assembly of claim 7, wherein the optical servo transducer comprises an optical servo head.

11. The head assembly of claim 10, wherein the optical servo head comprises a light source and at least one photodetector.

12. The head assembly of claim 11, wherein the optical servo head further comprises a beam splitter and a lens.

13. The head assembly of claim 11, wherein the light source comprises a laser light source.

14. The head assembly of claim 7, wherein, as the optical servo transducer assembly moves in a first direction, the magnetic transducer assembly the moves in the first direction.

15. The head assembly of claim 7, wherein, as the optical servo transducer assembly moves a first distance, the magnetic transducer assembly the moves the first distance.

16. A tape drive system, comprising: a magnetic/optic head, comprising:
   a magnetic head; and
   an optical servo head, the optical servo head being physically coupled directly to the magnetic head in a configuration that permits transport of magnetic tape therebetween;
   a fine head positioner mechanically coupled to the magnetic head so that the fine head positioner is capable of moving the magnetic/optic head; and
   a coarse head positioner mechanically coupled to the fine head positioner so that the coarse head positioner is capable of moving the fine head positioner.

17. The tape drive system of claim 16, wherein the fine head positioner comprises:
   a head mounting beam structure; and
   a head mounting beam structure including a fulcrum, wherein the head mounting beam structure can pivot about the head mounting structure, and a mass about the fulcrum is substantially equal.

18. The tape drive system of claim 17, wherein the fine head positioner further comprises a voice coil motor capable of applying a torque force to the head mounting beam structure.

19. The tape drive system of claim 18, wherein the fine head positioner is configured so that, as a tape moves through the tape drive system in a first direction, the fine head positioner moves the head in a second direction perpendicular to the first direction.

20. The tape drive system of claim 18, wherein the coarse head positioner comprises a step motor and a lead screw.

21. The tape drive system of claim 16, wherein the coarse head positioner is configured so that, as a tape moves through the tape drive system in a first direction, the coarse head positioner moves the head in a second direction perpendicular to the first direction.

22. The tape drive system of claim 16, further comprising a transport electronics circuit electronically connected to the magnetic head structure, the optical servo head, the coarse head positioner and the fine head positioner.

23. The tape drive system of claim 22, wherein the transport electronics circuit comprises a fine head position control loop for controlling the position of the magnetic/optic head.

24. The tape drive system of claim 22, wherein the transport electronics circuit comprises a coarse head position system for controlling the coarse position of the magnetic/optic head.

25. The tape drive system of claim 22, wherein the transport electronics circuit comprises a coarse head position control loop for controlling the position of the magnetic/optic head.

* * * * *